(12) United States Patent
Daniels et al.

(10) Patent No.: US 6,319,978 B1
(45) Date of Patent: Nov. 20, 2001

(54) WATER BORNE PRESSURE SENSITIVE VINYL ACETATE/ETHYLENE ADHESIVE COMPOSITIONS

(75) Inventors: Christian Leonard Daniels, Macungie; Chung-Ling Mao, Emmaus; Richard Henry Bott, Macungie; Menas Spyros Vratsanos, Breinigsville, all of PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 09/164,308

(22) Filed: Oct. 1, 1998

(51) Int. Cl.$^7$ .................................................... C08L 31/02
(52) U.S. Cl. ............... 524/564; 524/742; 524/748; 524/755; 524/761; 524/762; 524/776; 526/318.6
(58) Field of Search ..................... 524/564, 563, 524/742, 748, 755, 761, 762, 776; 526/318.6

(56) References Cited

U.S. PATENT DOCUMENTS

| | | | |
|---|---|---|---|
| 3,562,229 | 2/1971 | Bauer et al. | 260/80.81 |
| 4,128,518 | 12/1978 | Oyamada et al. | 260/29.6 WB |
| 4,322,516 | 3/1982 | Wiest et al. | 526/307.7 |
| 4,610,920 * | 9/1986 | Mudge et al. | 428/288 |
| 4,694,056 | 9/1987 | Lenney | 526/202 |
| 4,698,384 * | 10/1987 | Mao | 524/458 |
| 4,740,394 * | 4/1988 | Mudge | 427/389.9 |
| 4,745,025 * | 5/1988 | Mao | 428/288 |
| 4,753,846 * | 6/1988 | Mudge | 428/343 |
| 4,762,866 * | 8/1988 | Shih et al. | 523/412 |
| 4,774,283 * | 9/1988 | Goldstein | 524/816 |
| 4,812,547 * | 3/1989 | Mudge | 526/301 |
| 4,814,226 * | 3/1989 | Goldstein | 428/288 |
| 4,822,676 * | 4/1989 | Mudge | 428/343 |
| 4,826,938 * | 5/1989 | Mudge | 526/301 |
| 4,829,139 * | 5/1989 | Mudge | 526/301 |
| 4,975,320 * | 12/1990 | Goldstein et al. | 428/288 |
| 5,180,772 * | 1/1993 | Mao et al. | 524/816 |
| 5,242,963 * | 9/1993 | Mao | 524/272 |
| 5,276,084 | 1/1994 | Cheng et al. | 524/555 |
| 5,278,211 * | 1/1994 | Chandran et al. | 524/111 |
| 5,622,783 | 4/1997 | Huizer et al. | 428/355 EN |
| 5,633,334 * | 5/1997 | Walker et al. | 526/202 |
| 5,665,816 | 9/1997 | Gerharz et al. | 524/733 |

* cited by examiner

*Primary Examiner*—Judy M. Reddick
(74) *Attorney, Agent, or Firm*—Mary E. Bongiorno

(57) ABSTRACT

The present invention is directed to improved vinyl acetate ethylene pressure sensitive adhesive emulsion polymers. The improvement in the aqueous based, emulsion polymerized pressure sensitive adhesives resides in:

a high ethylene content copolymer having a Tg of from −25 to −70° C.;

a tensile storage modulus measured at one hertz and at a temperature of −20° C. embraced by the points on a plot of storage modulus and temperature of from 1 times $10^6$ and the points 4 times $10^9$ dynes/cm$^2$ and less that 1 times $10^7$ dynes/cm$^2$ measured at 50° C.

14 Claims, 1 Drawing Sheet

WATER BORNE PRESSURE SENSITIVE VINYL ACETATE/ETHYLENE ADHESIVE COMPOSITIONS

TECHNICAL FIELD

This invention relates to improved aqueous based pressure vinyl acetate/ethylene pressure sensitive adhesive emulsions.

BACKGROUND OF THE INVENTION

Pressure sensitive adhesives are widely used for fabricating paper labels, laminating polymeric films such as laminating poly(vinyl chloride), polyester, etc., for forming decals, repositionable notes and other related products. Most of the pressure sensitive adhesives have been solvent based but in recent years government regulations have forced the industry to develop environmentally friendly aqueous based pressure sensitive adhesives.

Aqueous based pressure sensitive adhesives comprised of polymerized monomer units of vinyl acetate and ethylene (VAE), and/or acrylic esters, etc. have been inferior to the solvent based pressure sensitive adhesives in that they do not have sufficient dry tack or cohesive strength and the lack of desirable properties limits the use of these polymers as pressure sensitive adhesives.

There is a wide variety of applications for pressures sensitive adhesives and by pressure sensitive it is meant that that the polymer exhibits dry tack and will instantaneously adhere to a substrate with finger tip pressure at temperatures ranging from −20 to 25° C. Most applications for permanent type pressure sensitive adhesives require excellent peel, tack and shear. Repositionable adhesives may require less tack but sufficient tack and cohesive strength to adhere to a substrate and yet be able to be removed without a portion of the adhesive adhering to the substrate. These pressure sensitive adhesives should also be resistant to oozing from the substrate when applied thereto and placed under pressure as in roll stock. Aqueous emulsion pressure sensitive adhesives must also be able to be coated on the various adhesive substrates such as Mylar, polyvinyl chloride and silicon containing coated polymers.

The following patents describe a variety of emulsion polymers incorporating vinyl esters and their use as adhesives:

U.S. Pat. No. 5,276,084 discloses aqueous based pressure sensitive adhesives based on polymers comprising vinyl acetate, ethylene, alkyl acrylates dialkyl maleate and fumarates, hydroxyalkyl acrylates, acrylamide and unsaturated carboxylic acids such as acrylic acid. The polymers are low in ethylene content, e.g., 5 to 30% by weight of the polymer.

U.S. Pat. No. 4,694,056 discloses vinyl acetate based pressures sensitive adhesives which comprise vinyl acetate, dioctyl maleate and acrylic acid polymerized in the presence of polyvinyl alcohol, and ethoxylated acetylenic glycol.

U.S. Pat. No. 5,665,816 discloses aqueous dispersions of polymerized units of vinyl acetate, ethylene and vinyl or acrylic ester or acrylic esters which carry epoxide groups. A cellulose ether such as hydroxyethyl cellulose is also included in partly grafted form. The resulting polymers have a glass transition temperature of from 0 to −40° C. and are used as adhesives.

U.S. Pat. No. 3,562,229 discloses solvent polymerized copolymers of ethylene and vinyl esters where the vinyl esters are derived from long chain carboxylic acids, e.g., versatic acid which are mixtures of $C_{9-11}$ carboxylic acids. Isotridecanoic and isononanoic are representative acids. The solvent based polymers incorporating vinyl esters of versatic acid were alleged to be superior to polymers incorporating vinyl laurate which has the same number of carbon atoms.

U.S. Pat. No. 4,322,516 discloses pressure sensitive adhesive emulsions whose copolymers comprise:
(a) 10–30 wt % ethylene,
(b) 29–69 wt % acrylic acid esters of alcohols,
(c) 20–55 wt % vinyl acetate,
(d) 0.2–8 wt % (meth)acrylamide, and
(e) 0–12 wt % other olefinically unsaturated comonomers.

Tackifying agents are incorporated into the ethylene based pressure sensitive adhesives to enhance effectiveness.

U.S. Pat. No. 4,128,518 discloses a pressure-sensitive adhesive comprised of an aqueous emulsion of vinyl acetate/ ethylene copolymer having an ethylene content of from 15 to 40% and a benzene-insoluble part of less than 30% by weight. The intrinsic viscosity of the benzene soluble portion is from 0.4 to 1.4 dl per gram. The polymer is prepared in the presence of a protective colloid and a polyoxyethylenic nonionic surfactant. In the polymerization process, the vinyl acetate monomer is added continuously during the emulsion polymerization process. Polymers having an ethylene content in excess of 40% were unsuited due to low tack presumably caused by high ethylene crystallinity.

U.S. Pat. No. 5,622,783 discloses vinyl acetate/ethylene/ vinyl chloride adhesive wherein the polymer contains at least 40% by weight of vinyl acetate. The pressure sensitive adhesive when applied from an organic solvent is particularly adapted for adhering substrates to plasticized polyvinyl chloride.

BRIEF SUMMARY OF THE INVENTION

The present invention is directed to improved aqueous based pressure sensitive adhesive emulsion polymers based upon copolymers of vinyl acetate and ethylene. The improvement in the aqueous based, emulsion polymerized vinyl acetate/ethylene pressure sensitive adhesives resides in:

a high ethylene content copolymer having a Tg of from −20 to −70° C. and preferably from −25 to −45° C.; and, a tensile storage modulus measured at one hertz and embraced by the points on a plot of storage modulus and temperature of from 1 times $10^6$ and 4 times $10^9$ dynes/$cm^2$ at a temperature of −20° C. and less than 1 times $10^7$ dynes/$cm^2$ but greater than 1 times $10^3$ at 50° C.

There are significant advantages associated with the above aqueous based pressure sensitive adhesive emulsions and the process for producing these emulsions and these advantages include:

an ability to be coated on a variety of adhesive substrates;

an ability to adhere to hard to adhere surfaces such as Mylar polyester, corona treated polyethylene and polypropylene;

an ability to generate a class of water borne vinyl acetate/ ethylene pressure sensitive adhesives which have an excellent balance of peel and cohesive strength while retaining dry tack; and, an ability to effect bonding vinyl and other substrates which contain plasticizers.

DETAILED DESCRIPTION OF THE INVENTION

Emulsion polymerization of ethylenically unsaturated monomers such as lower vinyl esters, typically represented by vinyl acetate or vinyl propionate, to produce aqueous based adhesive emulsions is well known. The improvement resides in pressure sensitive adhesive compositions of vinyl acetate and ethylene which are high in ethylene content. Traditionally, vinyl acetate/ethylene based pressures sensitive adhesives had been prepared at low ethylene content, i.e., below about 40% by weight and generally below 35%, and incorporated substantial levels of soft monomers such as dioctyl maleate or higher alkyl esters of (meth)acrylic acid.

The aqueous based pressure sensitive adhesive emulsions are based on emulsions which comprise a colloidal dispersion of copolymerized units of vinyl acetate and ethylene in water. The copolymers present in the pressure sensitive adhesives are typically derived from the following monomers and within the percentage proportions listed below:

(a) 25–65 wt % vinyl acetate, preferably 40–50 wt %;
(b) from 45 to 65 wt % of ethylene; preferably from about 45–55 wt %;
(c) 0.2–10 wt % alpha, beta-ethylenically unsaturated monocarboxylic acid, preferably 0.5 to 2%;
(d) 0–10% wt % of a vinyl ester of saturated aliphatic acids, preferably a vinyl ester of a $C_{8-13}$ neo-acid;
(e) 0–10 wt % di-($C_{1-13}$) alkyl maleate/fumarate, preferably 0 to 10 wt %;
(f) 0–10 wt % ($C_{1-8}$) alkyl esters of acrylic and methacrylic acid; and,
(g) 0–5 wt % of a ($C_{1-13}$) hydroxyalkyl (meth)acrylate.

As noted, a variety of comonomers, e.g., other ethylenically unsaturated monomers sometimes employed in the formation of the aqueous based vinyl acetate/ethylene pressure sensitive adhesive emulsions can be copolymerized with these monomers to form high ethylene content vinyl acetate/ethylene pressure sensitive adhesives. For example, $C_{1-13}$ alkyl (meth)acrylate monomers, preferably $C_{1-8}$ alkyl (meth)acrylates which include methyl methacrylate, ethyl acrylate, butyl acrylate, hexyl acrylate, 2-ethylhexyl acrylate, isooctyl acrylate, isodecyl acrylate and the like, diesters of maleic acid or fumaric acid, the diester being formed by the reaction of the acid with a $C_{1-13}$ alkanol, such as, n-octyl alcohol, isooctyl alcohol, butyl alcohol, isobutyl alcohol, methyl alcohol, amyl alcohol, $C_{1-8}$ alkyl vinyl ethers and alpha, beta-ethylenically unsaturated $C_{3-6}$ carboxylic acids can be incorporated into the polymer. Unsaturated acids which include methacrylic acid, crotonic acid and acrylic acid and alkyl vinyl ethers such as methyl vinyl ether, ethyl vinyl ether, isopropyl vinyl ether, n-propyl vinyl ether, tert-butyl vinyl ether and n- and isobutyl vinyl ether can also be employed. Also included for use with the above monomers are vinyl esters of $C_{8-13}$ neo-acids which are comprised of a single vinyl ester or mixture of tri- and tetramers which have been converted to the corresponding single or mixture of $C_{8-13}$ neo-acids.

The sum of the monomers used to form the pressure sensitive vinyl acetate/ethylene copolymers is 100 percent. Generally, not more than about 20% and preferably not more than 10% by weight of a fourth or more monomer is incorporated into the polymer. As stated, the emulsion copolymers are designed to have a $T_g$ of less than −20° C., preferably −25 to −45° C. A preferred copolymer thus consists essentially of polymerized units of vinyl acetate, ethylene and an unsaturated carboxylic acid with an ethylene content from 45 to 55% by weight and an acid content of from 0.5 to 2% by weight. Preferably, the unsaturated carboxylic acid is acrylic acid.

The method of producing the latex polymers of this invention is believed to be an important factor in producing the pressure sensitive vinyl acetate/ethylene adhesives high in ethylene content with tensile mechanical properties that provide excellent peel strength while retaining sufficient cohesive strength to make it useful. Process steps that are considered to be particularly important are: controlling the amount of vinyl acetate in the reaction medium at the beginning and during the polymerization process, adding initiator at the high end of the amounts typically used in emulsion polymerization reactions and controlling polymerization temperature. It is believed that these process steps serve to control the polymer molecular weight and ultimately the viscoelastic properties as shown by tensile dynamic mechanical data in the storage modulus/temperature plots.

One factor relevant to providing a vinyl acetate/ethylene polymer having a high ethylene content and yet impart dry tack to the polymer is the delay addition of the vinyl acetate and monomers. More specifically, the reaction vessel is charged initially with less than 15%, preferably less than 10%, vinyl acetate by weight, and the remaining vinyl acetate is delay fed (i.e. added during polymerization) so that the unreacted vinyl acetate concentration is maintained below about 7%, preferably below 5%, based on total monomers, during the polymerization process. Vinyl acetate monomer is added at a rate that limits the polymerization time to no longer than about 10 hours, preferably less than 6 hours. Short reaction times, i.e., less than 6 hours, are preferred in order to maximize throughput during production and to improve product performance.

The quantity of ethylene entering into the copolymer is influenced by unreacted vinyl acetate, pressure, agitation and viscosity of the polymerization medium. Thus, to increase the ethylene content of the copolymer, high pressures, greater agitation and a low viscosity can be employed. Ethylene pressure in the reactor ranges from about 500 psig to 2000 psig (34 to 136 atm), preferably about 900 to 1400 psig to produce the desired Tg.

Polymerization can be initiated by thermal initiators or by a redox system. A thermal initiator should be used at temperatures at or above about 70° C. and redox systems are preferred when a polymerization temperature below about 70° C. is used. The viscoelastic properties are influenced by small changes in temperature and by initiator composition and concentration. The amount of thermal initiator used in the process is 0.1 to 3 wt %, preferably from 0.5 to 1.5 wt %, based on total monomers. Thermal initiators are well known in the emulsion polymer art and include, for example, ammonium persulfate, sodium persulfate, and the like. The amount of oxidizing and reducing agent in the redox system is about 0.1 to 3 wt %. Any suitable redox system known in the art can be used; for example, the reducing agent can be a bisulfite, a sulfoxylate, ascorbic acid, erythorbic acid, and the like. The oxidizing agent can include hydrogen peroxide, organic peroxide such as t-butyl peroxide, persulfates, and the like.

Chain transfer agents, well known in the aqueous emulsion polymerization, are typically used in the polymerization process but are not required. Examples of chain transfer agents include dodecyl mercaptan, mercaptocarboxylic acids, and esters of mercaptocarboxylic acid. The chain transfer agent is added at levels of about 0.02 to 2 wt %, preferably 0.1 to 1 wt %, based on the weight of monomers.

Effective emulsion polymerization reaction temperatures range from about 50 and 100° C.; preferably 75 to 90° C. when using a thermal initiator such as ammonium persulfate.

In order to maintain the pH of the system at the desired value, there is suitably added a buffering agent of any convenient type. Any alkaline material which is compatible with the stabilizing agent can be used as the buffer. The amount of buffer is that sufficient to adjust the pH of the system within the desired range, e.g., 2.5 to 10 and preferably 3.5 and 8.5. The amount of buffer is generally about 0.1 to 0.5% by weight, based on the monomers.

The reaction time will also vary depending upon other variables such as the temperature, the catalyst, and the desired extent of the polymerization. It is generally desirable to continue the reaction until less than 0.5% of the vinyl ester remains unreacted. Under these circumstances, a reaction time of about 6 hours has been found to be generally sufficient for complete polymerization, but reaction times ranging from 2 to 10 hours have been used, and other reaction times can be employed, if desired.

The stabilizing system typically consists of 0.5–5 wt %, of a surfactant or a blend of surfactants based on total monomer charged to the system. The surfactants contemplated for the invention include any of the known and conventional surfactants and emulsifying agents, principally the nonionic and anionic materials, heretofore employed in the emulsion copolymerization of vinyl acetate and ethylene; polyalkoxylated surfactants being especially preferred. The use of protective colloids such as polyvinyl alcohol and hydroxyethyl cellulose as a component of the stabilizing system, in contrast to stabilizing systems for many vinyl acetate/ethylene based adhesives, should be avoided. The presence of conventional levels of polyvinyl alcohol, e.g., 1 to 3% based upon monomers, in the polymerization process tends to result in a polymer having undesirable loop tack. Although it may be possible to use a small amount, e.g., <0.5% based upon the weight of total monomers of a protective colloid such as polyvinyl alcohol, in most cases it is preferred the polymer emulsion should be substantially devoid of protective colloid. Among the nonionic surfactants found to provide good results are the ethoxylated secondary alcohols such as the Igepal surfactants supplied by Rhone-Poulenc and Tergitols supplied by Union Carbide and sulfosuccinates. The Igepal surfactants are members of a series of alkylphenoxy-poly(ethyleneoxy)ethanols having alkyl groups containing from about 7–18 carbon atoms, and having from about 4 to 100 ethyleneoxy units, such as the octylphenoxy poly(ethyleneoxy)ethanols, nonylphenoxy poly(ethyleneoxy)ethanols, and dodecylphenoxy poly(ethyleneoxy)ethanols. Examples of nonionic surfactants include polyoxyalkylene derivatives of hexitol (including sorbitans, sorbides, manitans, and mannides) anhydride, partial long-chain fatty acid esters, such as polyoxyalkylene derivatives of sorbitan monolaurate, sorbitan monopalmitate, sorbitan monostearate, sorbitan tristearate, sorbitan monooleate and sorbitan trioleate.

The stabilizing system, including delay addition of monomers and stabilizer influences the resulting particle size of the polymer. Preferred polymer particle size diameters will have a number average of from 0.1 to 0.4 $\mu$ and a weight average particle size from 0.15 to 0.8 $\mu$.

Cast films of the VAE pressure sensitive adhesive emulsion polymers of this invention should have a tensile storage modulus (test frequency of 6.28 rad/sec) within the area encompassed by the following data points: $1 \times 10^6$ and $4 \times 10^9$ dynes/cm$^2$ at $-20°$ C., and $1 \times 10^3$ and $1 \times 10^7$ dynes/cm$^2$ at 50° C. and preferably within the area encompassed by the following data points: $5 \times 10^6$ and $2 \times 10^8$ dynes/cm$^2$ at $-20°$ C., and $1 \times 10^4$ and $1 \times 10^6$ dynes/cm$^2$ at 50° C. It has been found in this invention that tensile mechanical properties, specifically tensile storage modulus, provide an accurate measure of viscoelastic properties in evaluating adhesive properties of pressure sensitive adhesives. The low temperature storage modulus values, as defined, is believed to account for good tack and peel which are required for use at room temperature. High temperature storage modulus is an indicator of cohesive strength.

Without intending to be bound by theory, it is believed that vinyl acetate/ethylene (VAE) emulsion polymers having a tensile storage modulus below the area encompassed by the numbers as described above will be too soft for providing acceptable shear and VAE emulsion polymers having a tensile modulus above the area will not have sufficient tack and peel strength at room temperature for difficult to bond surfaces.

The following examples are provided to illustrate various embodiments of the invention and are not intended to restrict the scope thereof.

EXAMPLE 1

Preparation of VAE Pressure Sensitive Adhesives ~50% Ethylene, 85° C. and Use of Thermal Initiator A copolymer was prepared in a 35 gallon stainless steel reactor with a maximum operating pressure of about 2000 psi. The reactor was equipped with a jacket for cooling, a mechanical turbine agitator, and metering pumps for addition of the various feeds. De-ionized water was used for all experiments.

The reactor was charged with 28,100 g of water, 2,170 g of Igepal CO-887 (70% solution of a 30 mole nonylphenol ethoxylate), 2,025 g of Polystep B-27 (30% solution of a sodium salt 4 mole sulfated nonylphenol ethoxylate) and 2,400 g of vinyl acetate. After the initial charges the reactor was purged with nitrogen and ethylene and heated under agitation to 85° C., then pressurized to 1400 psig with ethylene. Addition of an ammonium persulfate solution (814 g ammonium persulfate, 271 g sodium bicarbonate and 7059 g water) was begun and fed to the reactor uniformly over 5 hours. Upon evidence of an exotherm (about 5 minutes after beginning the persulfate feed), addition of a monomer solution was begun and added uniformly over a 5 hour period. The monomer solution consisted of: 32,000 g of vinyl acetate, 912 g of acrylic acid.

During the polymerization ethylene was introduced to the reactor at a rate sufficient to maintain the pressure at 1400 psi. Samples were taken during polymerization to maintain the vinyl acetate content to less than 5% by weight. Three hours after initiation 3,760 g water was fed to the reactor uniformly over a two hour period. At the completion of the vinyl acetate—acrylic acid monomer addition the ethylene feed to the reactor was discontinued. A total of 37,003 g (including that used to initially pressurize the reactor) of ethylene was added to the reactor. The contents were then held at 85° C. for an additional 45 min and then cooled to 32° C. The contents were then transferred to a 60 gallon vessel where vacuum was used to remove any unreacted ethylene.

The physical properties of the resultant latex were:

| % non-volatile | 57.9 |
|---|---|
| Tg | −35° C. |
| Viscosity | 150 cps |
| (Brookfield RVF viscometer, #4 spindle, 20 rpm) | |
| pH | 4.2 |
| coagulum | <0.1% (100 mesh screen) |
| percent ethylene (wt %) | ~50 |

EXAMPLE 2

Delay Surfactant Addition In Preparation of VAE

The procedure of Example 1 was essentially repeated except that a portion of the surfactant stabilizer was added as a delay and the solids level was adjusted. The reactor was charged with 32,500 g of water, 1,285 g of Igepal CO-887 (70% solution of a 30 mole nonylphenol ethoxylate), 1,500 g of Polystep B-27 (30% solution of a sodium salt 4 mole sulfated nonylphenol ethoxylate) and 2,400 g of vinyl acetate. After the initial charges the reactor was purged with nitrogen and ethylene and heated under agitation to 85° C., then pressurized to 1400 psig with ethylene. Addition of an ammonium persulfate solution (390 g ammonium persulfate, 117 g sodium bicarbonate and 3,395 g water) was begun and fed to the reactor uniformly over 5 hours.

Upon evidence of an exotherm (about 5 minutes after beginning the persulfate feed), addition of a monomer solution was begun and added uniformly over a 5 hour period. The monomer solution consisted of: 27,000 g vinyl acetate and 800 g acrylic acid. A solution of 2,000 g water, 600 g sodium vinyl sulfonate (25%) and 1,500 g of the Polystep B-27 surfactant was also added over the same 5 hour period. During the polymerization ethylene was introduced to the reactor at a rate sufficient to maintain the pressure at 1400 psi. The vinyl acetate level was maintained below about 5% by weight during polymerization. At the completion of the vinyl acetate—acrylic acid monomer addition the ethylene feed to the reactor was discontinued. A total of 34,046 g (including that used to initially pressurize the reactor) of ethylene was added to the reactor. The contents were then held at 85° C. for an additional 45 min and cooled to 32° C. The contents were then transferred to a 60 gallon vessel where vacuum was used to remove any unreacted ethylene. At this point 40 g of Colloids™ 675 (a proprietary defoamer composition supplied by Rhone-Poulenc) was added to reduce foaming After pulling vacuum on the vessel for 30 minutes the following solutions were added to further reduce any unreacted monomers: 2.5 g ferrous ammonium sulfate in 90 g water, 30 g sodium formaldehyde sulfoxylate in 180 g water and 40 g of t-butyl hydroperoxide (70%) in 250 g water.

The physical properties of the resultant latex were:

| % non-volatile | 58.4 |
|---|---|
| Tg | −31° C. |
| Viscosity | 990 cps |
| (Brookfield RVF viscometer, #4 spindle, 20 rpm) | |
| pH | 3.81 |
| coagulum (100 mesh screen) | <0.1% |
| percent ethylene (wt%) | ~50 |

The only real significance between this example and that of Example 1 appeared to be in the overall quality of the latex. The delay addition of the surfactant resulted in fewer grits and a better overall quality of the latex.

EXAMPLE 3

Effect Of Redox Initiator And Lower Reaction Temperature (50° C.) And The Use Of A t-Butylhydroperoxide Redox System The procedure of Example 1 was repeated except that a 3800 ml pressure reactor equipped with a turbine agitator, a cooling jacket, pumps and delay feeds to allow introduction of various solutions and monomers throughout the course of the reaction was employed. Again, de-ionized water was used for all experiments. A redox initiator and lower reaction temperature was used.

The reactor was charged with 700 g of water, 40.5 g of Igepal CO-887 (70% aqueous solution nonionic surfactant supplied by Rhone Poulenc), 47.7 g of Polystep B-27 (30% aqueous solution, anionic surfactant supplied by Stepan Co.), 5 g of a 1% aqueous solution of ferrous ammonium sulfate, 0.48 g of acetic acid and 75 g of vinyl acetate.

After purging the reactor with nitrogen and ethylene the reactor was heated to 50° C. and pressurized with 415 g of ethylene, the resulting pressure was 1050 psig. During the pressurization, 15 g of 15% aqueous solution of sodium formaldehyde sulfoxylate was added. After pressure equilibration, the reaction was initiated by the addition of a 10% aqueous solution of tert-butylhydroperoxide at a rate of 0.6 gm/min; the tert-butylhydroperoxide solution consisted of: 256 g of water, 56 g of 70% aqueous solution of tert-butylhydroperoxide, 63 g of Polystep B-27 and 25 g of a 25% aqueous solution of sodium vinyl sulfonate. When initiation was observed by an increase in reactor temperature, delay feeds of vinyl acetate/acrylic acid (971 gms/28.6 gms) and sodium formaldehyde sulfoxylate (15% aqueous solution) were begun at 3.7 gm/min and 1.1 gm/min, respectively. The addition rate of the 10% aqueous solution of tert-butylhydroperoxide was increased to 1.1 gm/min. During the reaction, the ethylene pressure was ramped to 1400 psig. The vinyl acetate/acrylic acid mixture was added over 4 hours and the addition rates of the tert-butylhydroperoxide and sodium formaldehyde sulfoxylate were increased incrementally to 3.1 gm/min during the course of the reaction.

The physical properties of the resultant latex were:

| % non-volatile | 42 |
|---|---|
| Tg | −29° C. |
| Viscosity | 40 cps |
| (Brookfield RVF viscometer, #4 spindle, 12 rpm) | |
| coagulum (100 mesh screen) | <0.1% |
| percent ethylene (wt %) | 40–50 |

EXAMPLE 4

VAE Employing Lower Thermal Initiator Concentration And A Higher (90° C.) Reaction Temperature The procedure of Example 2 was repeated except the reactor was charged with: 1037 g of water, 40.5 g of Igepal CO-887, 47.7 g of Polystep B-27 and 64 g of vinyl acetate. After purging the reactor with nitrogen and ethylene, the reactor was heated to 90° C. and pressurized with 1400 psig of ethylene. When the pressure and temperature had equilibrated, the reaction was initiated through the addition of a 7.5% solution of ammonium persulfate. When initiation was observed, a vinyl acetate delay consisting of 971 g of vinyl acetate and 28.6 g of acrylic acid was started at a rate of 3.7 g/min. Another delay solution consisting of 102 g of water, 70 g of Polystep B-27 and 28 g of a 25% aqueous solution of sodium vinyl sulfonate was also added at a rate of 0.56 gm/min. The ethylene pressure was maintained at 1400 psig throughout the reaction and the monomer delay was added over 4 hours. A total of 137 g of the ammonium persulfate solution were added, 135 g of the surfactant solution were added and 895 g of the monomer solution were added.

The physical properties of the resultant latex were:

| % non-volatile | 53 |
|---|---|
| Tg | −31° C. |
| Viscosity (Brookfield RVF viscometer, #4 spindle, 12 rpm) | 170 cps |
| coagulum (100 mesh screen) | <0.1% |
| percent ethylene (wt %) | 40–50 |

EXAMPLE 5
VAE Employing Lower Thermal Initiator Concentration At 85° C.

The procedure of Example 4 was repeated with the exception that the reaction was conducted at 85° C.

The physical properties of the resultant latex were:

| % non-volatile | 58.4 |
|---|---|
| Tg | −31° C. |
| Viscosity (Brookfield RVF viscometer, #4 spindle, 20 rpm) | 990 cps |
| coagulum (100 mesh screen) | <0.1% |
| percent ethylene (wt %) | 40–50 |

EXAMPLE 6
VAE Using Carboxyethyl Acrylate Monomer

The procedure of Example 4 was repeated with the exception that the carboxyl containing monomer was changed. The reactor was charged with: 1037 g of water, 40.5 g of Igepal CO-887, 47.7 g of Polystep B-27 and 64 g of vinyl acetate. After purging the reactor with nitrogen and ethylene, the reactor was heated to 85° C. and pressurized with 1400 psig of ethylene. When the pressure and temperature had equilibrated, the reaction was initiated through the addition of a 10% solution of ammonium persulfate. when initiation was observed, a vinyl acetate delay consisting of 943 g of vinyl acetate and 57.6 g of carboxyethyl acrylate (β CEA supplied by Rhone Poulenc) was started at a rate of 3.7 g/min. Another delay solution consisting of 102 g of water, 70 g of Polystep B-27 and 28 g of a 25% aqueous solution of sodium vinyl sulfonate was also added at a rate of 0.56 gm/min. The ethylene pressure was maintained at 1400 psig throughout the reaction and the monomer delay was added over 4 hours. A total of 138 g of the ammonium persulfate solution were added, 135 g of the surfactant solution were added and 895 g of the monomer solution were added.

The physical properties of the resultant latex were:

| % non-volatile | 55 |
|---|---|
| Tg | −32° C. |
| Viscosity (Brookfield RVF viscometer, #4 spindle, 12 rpm) | 350 cps |
| coagulum (100 mesh screen) | <0.1% |
| percent ethylene (wt %) | 40–50 |

COMPARATIVE EXAMPLE 7
VAE Emulsions Low Temperature (65° C.) And Thermal Initiator Concentration The procedure of Example 4 was repeated in an effort to generate a vinyl acetate/ethylene polymer having storage modulus data points outside the desired range.

The reactor was charged with: 1037 g of water, 40.5 g of Igepal CO-887, 47.7 g of Polystep B-27 and 64 g of vinyl acetate. After purging the reactor with nitrogen and ethylene, the reactor was heated to 65° C. and pressurized with 1300 psig of ethylene. When the pressure and temperature had equilibrated, the reaction was initiated through the addition of a 10% solution of ammonium persulfate. When initiation was observed a vinyl acetate delay consisting of 971 g of vinyl acetate and 28.8 g of acrylic acid was started at a rate of 3.0 g/min. Another delay solution consisting of 102 g of water, 70 g of Polystep B-27 and 28 g of a 25% aqueous solution of sodium vinyl sulfonate was also added at a rate of 0.45 gm/min. The ethylene pressure was maintained at 1300 psig throughout the reaction and the monomer delay was added over 5 hours. A total of 138 g of the ammonium persulfate solution were added, 135 g of the surfactant solution were added and 895 g of the monomer solution were added.

The physical properties of the resultant latex were:

| % non-volatile | 58.4 |
|---|---|
| Tg | −31° C. |
| Viscosity (Brookfield RVF viscometer, #4 spindle, 20 rpm) | 990 cps |
| coagulum (100 mesh screen) | <0.1% |
| percent ethylene (wt %) | 40–50 |

COMPARATIVE EXAMPLE 8

Vinyl Acetate-Ethylene-Acrylic Acid Polymers Delay Addition-Polyvinyl Alcohol Stabilized A series of polymers was prepared in a one-gallon reactor equipped with a jacket for cooling, a mechanical turbine agitator, and metering pumps for addition of the various feeds. Deionized water was used. The reactor was charged with 1113 g of water, 57.0 g of Airvol® 203 poly (vinyl alcohol) (supplied by Air Products and Chemicals, Inc.), 40.7 g of Igepal CO-887 (70% solution of a 30 mole nonylphenolethoxylate supplied by Rhone-Poulenc) and 75.0 g vinyl acetate. After the initial charging, the reactor was purged with nitrogen followed by an ethylene purge, and heated under agitation to 85° C., then pressurized to 1000 psig (68 atm) with ethylene. Addition of an ammonium persulfate (40 g ammonium persulfate (APS), 17 g sodium bicarbonate and 347 g water) solution was begun at a rate of 2.5 g/min, after 8 minutes the feed rate was slowed to 2.0 g/min. Upon evidence of an exotherm (about 5 minutes after beginning the persulfate feed), addition of a second monomer solution was begun and added uniformly over a 3-hour period. The second monomer solution consisted of: 1225.2 g vinyl acetate, 57.0 g acrylic acid, and 9.5 g n-dodecyl mercaptan, as chain transfer agent. During the polymerization, ethylene was introduced to the reactor at a rate sufficient to maintain the pressure at 1000 psig. The persulfate addition was discontinued 15 minutes after the monomer addition was complete. The contents were then held at 85° C. for an additional 45 minutes and then cooled to 32° C. The contents were then transferred to a 3-gallon vessel where vacuum was used to remove any unreacted ethylene. At this point, 2 g of Colloids™ 67 5 (a proprietary defoamer composition supplied by Rhone-Poulenc) was added to reduce foaming, followed by 1 g of sodium erythorbate in 10 g of water, then 1 g of t-butyl hydroperoxide in 10 g of water, to reduce residual vinyl acetate.

EXAMPLE 9

Particle Size Study

A series of emulsions was prepared in accordance with Example 5 for the purpose of determining the effect of initiator concentration and level on particle size.

In Run 9a the ammonium persulfate initiator concentration was 10% and a total of 274 g were added during the reaction.

In Run 9b the ammonium persulfate initiator concentration was 10% and a total of 138 g were added during the reaction.

In Run 9c the ammonium persulfate initiator concentration was 105 and a total of 138 g were added during the reaction; the initial amount of vinyl acetate being added to the reactor was 128 g.

In Run 9d, the ammonium persulfate initiator concentration was 10% and 138 g were used; the initial amount of vinyl acetate added to the reactor was 256 g.

The particle size results are shown in Table 1.

TABLE 1

| Run | Number average particle size ($\mu$m) | Weight average particle size ($\mu$m) |
| --- | --- | --- |
| 9a | 0.14 | 0.24 |
| 9b | 0.11 | 0.20 |
| 9c | 0.10 | 0.19 |
| 9d | 0.10 | 0.19 |

These results indicate that the particle size achieved during the polymerization runs is reasonably constant throughout even though there were significant variations in initial and final initiator concentration and levels.

EXAMPLE 10

Testing of VAE Polymers For Peel, Tack and Shear

The acetate/ethylene polymers of Examples 3–7 were tested for peel strength, loop track and sheer in accordance with accepted procedures and the results are shown in Table 2.

TABLE 1

|  | Ex 3 | Ex 4 | Ex 5 | Ex 6 | Ex 7 | Ex 8 |
| --- | --- | --- | --- | --- | --- | --- |
| Peel adhesion to Stainless steel (pli)[1] | 4.3 | 2.6 | 2.2 | 1.8 | 0.5 | 2.4 |
| Loop Tack (pli)[2] | 2.8 | 2.6 | 2.0 | 2.0 | 0.5 | 1.1 |
| Shear (hours)[3] | 0.5 | 8 | 33 | 22 | >250 | 53.1 |

[1]A method for determining the force to remove a PSA laminate from a test panel at an angle of 180°.
Materials and Equipment:
- Constant rate of extension tensile tester (1130 Instron or Equivalent)
  Note: Load cell not to exceed 100 lbs.
- Test panel (2" × 6") min. made of PSTC stainless steel.
  NOTE: The test panel should be cleaned using PSA test method #1. Equilibrate the test panels a minimum of 1.0 hour in the CTH room.
- 4.5 ± 0.1 lb mechanical roller as specified in PSTC 2.7.1
- Masking tape - 1 ± 1/64"
- Paper cutter - capable of cutting to 1 ± 1/64"
- Timer accurate to ±1.0 second Procedure:
NOTE: Test samples should be either production coated or produced using PSA test method #2. The test samples should condition a minimum of 12 hours, maximum 96 hours in a constant temperature and humidity room (CTH) (23° C. ± 2° C./50% ± 2% RH).
Check the calibration of the load cell by hanging a known weight in the upper jaws of the tensile tester. The weight should be approx. 50% of the working range. For example, with a 0 to 10 lb/in range, hang a 4.00 ± 0.05 lb weight and measure the load. If the measured value is within ±1.25% of the weight, the calibration is successful. If the calibration is unsuccessful, re-calibrate or consult the tensile tester manufacturer.

1. Using a paper cutter, cut a 1 ± 1/64" wide by ~8 inch long, minimum 6 inch sample out of the coated sheet. Be sure to cut lengthwise in the machine direction.
2. Lay down a 1 × 2 inch wide strip of release liner, silicone side up, across the bottom of the test panel. This will ensure the test strip does not contact the rough surface of the panel caused by the Instron jaws.
3. Without pressure, apply approximately 6 inches of the test strip (adhesive side down) onto a clean panel.
   Recommendation: Apply approximately 3/4" of the test strip to the bench top above the panel. Using a thumb, gently draw the test strip down the length of the panel.

TABLE 1-continued

NOTE: The test panel should be cleaned using PSA test method #1. Equilibrate the test panels a minimum of 1.0 hour in the CTH room.
4. Attach a min. 12 inch long piece of masking tape to the 1 inch wide test strip and loop it back to itself making a tail.
5. Using the automatic roll down machine, pass a 4.5 ± 0.1 lb rubber roller over the applied sample once in each length wise direction using only the weight of the roller. The sample should be rolled at a constant rate of 12.0 ± 0.5 inches per minute. Avoid air entrapment in the test samples when laminating to the test panel. Dwell time starts at the end of the return pass of the roller.
6. Place the test panel in the lower jaw of the Instron. The sample should face the operator. Place the masking tape tail in the upper jaw 180° to the panel. Ensure the test strip and tail are centered and plumb.
7. Set the extension rate on the Instron at 12.0 ± 0.5 in/min. At 30 ± 1 minutes, peel the sample off the panel until it is removed or it fails (tears).
8. The operator should note coat weight, face stock, and the release liner of the coated material, record failure mode, and average peel value in pounds per linear inch (pli). Unusual data should be noted and rechecked if necessary.

[2] A method for determining the force necessary to remove a pressure sensitive adhesive from a surface using no dwell time and no additional pressure. Also known as the Quick Stick Tack Measurement.

Materials and Equipment:
    Constant rate of extension tensile tester (1130 Instron or Equivalent)
    Note: Load cell not to exceed 100 lbs.
    Test panel to be PSTC stainless steel 1" ± 1/64" wide by 6" minimum
        Note: The test panel should be cleaned using PSA test method #1. Equilibrate the test panels a minimum of 1.0 hour in the CTH room.
- A fixture to hold the test panel. ● Transparent tape - 3/4" ± 1/64"
- Paper cutter - capable of cutting to 1 ± 1/64"
- A template to set a gap of 1 3/8" ± 1/32" from the test surface to the bottom of the traveling jaw     NOTE:    Test samples should be either production coated or produced using PSA test method #2. The test samples should condition a minimum of 12 hours, maximum 96 hours in a constant temperature and humidity room (CTH Room, 23° C. ± 2° C/50% ± 2% RH). Check the calibration of the load cell by hanging a known weight in the upper jaws of the tensile tester. The weight should be approx. 50% of the working range. For example, with a 0 to 10 lb/in range, hang a 4.00 ± 0.05 lb weight and measure the load. If the measured value is within ±1.25% of the weight, the calibration is successful. If the calibration is unsuccessful, re-calibrate or consult the tensile tester manufacturer.

Procedure
1. Place the fixture to hold the test panel in the tensile tester. Place a test panel in the fixture such that the longer axis of the plate is positioned at right angles to the test strip. Set the tensile tester control cycle to minimize and standardize the dwell time. A test cycle shall be defined as the distance traversed as the traveling jaw brings the test loop into full contact with the test substrate and then completely removes the test loop from the substrate. The traveling jaw should move at a rate of twelve inches per minute in each direction. The bottom of the traveling jaw should begin the return cycle at 1 3/8" from the test surface. This ensures a contact area of 1.00 ± 0.03 square inches.
2. Cut a strip 1" × 8" (±1/64") using the paper cutter. Be sure to cut lengthwise in the machine direction.
3. Fold approximately one inch of sample strip back from the release liner. Align a strip of transparent tape across the top edge of the release liner, adhesive side up. Close the test strip to the transparent tape forming a "T", adhesive to adhesive. Bring the opposite end of the test sample to the taped end and form a loop - adhesive side out. Close the loop with the transparent tape. Alternatively - Tape each end of all the samples prior to the start of testing.
4. Place the looped sample in the traveling jaw of the tensile tester such that only the transparent tape is covered. The loop must be plumb with the test panel.
5. Start the tensile tester and allow it to run through one cycle. Record the peak looptack value. Remove and discard the sample.

[3] A method for determining the ability of a PSA to support a hanging load. To measure the cohesive strength of the PSA.

Materials and Equipment:
- Rack or jig to hold the test panel at 2° back from vertical
- Test panel made of PSTC stainless steel. The test panel should have a scored line 1/2 ± 1/64" parallel to the bottom. This distance is measured from the bottom of the score line.
  NOTE: The test panel should be cleaned using PSA test method #1. Equilibrate the test panels a minimum of 1.0 hour in the CTH room.
- 4.5 ± 0.1 lb mechanical roller as specified in PSTC 2.7.1
- 500.0 ± 0.6 gram weight with wire hook
- Paper cutter - capable of cutting to 1/2 ± 1/64"
- Die Cutter - capable of cutting to 1/2 ± 1/64" (or 1 ± 1/64" for other shear sizes)
- Timer accurate to ±0.1 hour
- Single Hole punch - 7/32 ± 1/32" diameter
- Stapler
- 1" × ½" Strips of cardboard or other material to reinforce the test strip. The strips must be able to support the 500 gram weight indefinitely.

TABLE 1-continued

Procedure:
NOTE: Test samples should be either production coated or produced using PSA test method #2. The test samples should condition a minimum of 12 hours, maximum 96 hours in a constant temperature and humidity room (CTH) (23° C. ± 2° C./50% ± 2% RH).
1. Using a cutter, cut a 1/2 ± 1/64" wide sample out of the coated sheet. Be sure to cut lengthwise in the machine direction. Cut the strip into 2" to 2¼" lengths.
2. Remove the release liner taking care not to touch the ½" test area.
3. The test area is ½" × ½". Without pressure, carefully place the open end of the test strip (adhesive side down) at the lower edge of the ½" score mark. Gently apply the remainder of the overlap test area to the panel in a rolling motion to prevent air entrapment.
NOTE: The ½" × ½" test area must be free of coating defects.
4. Turn the panel over, i.e., face down. Place a 1" × ½" strip of reinforcing material on the adhesive side of the test strip, starting 1/8" to 1/4" from the bottom of the test panel. The reinforcing strip is applied parallel to the length of the test strip. Fold and adhere the balance of the test strip to the reinforcing strip.
5. Turn the panel over, i.e., face up. Punch a hole through the center of the lower half of the reinforcing material.
6. Apply a staple perpendicular to the test strip 1/8" to 1/4" above and below the hole. Be sure to penetrate the test strip and reinforcing material.
NOTE: The above measurements will ensure that the roller makes full contact with the ½" × ½" test area.
7. Using the automatic roll down machine, pass a 4.5 ± 0.1 lb rubber roller over the applied sample parallel to the length of the test strip once in each length wise direction using only the weight of the roller. The sample should be rolled at a constant rate of 12.0 ± 0.5 inches per minute. Dwell time starts at the end of the return pass of the roller. The standard dwell time is 30.0 minutes. The test panels and strips can dwell in the test jig.
8. At the end of the dwell period, the weight is applied to the test strip with no swinging motion. The timer is started immediately after the weight is applied.
9. The operator should note the time to failure, and failure mode. Unusual data should be noted and rechecked if necessary.
Definition of failure modes:
    Cohesive failure - the adhesive film is split to leave a significant residue on both the panel and test strip.
    Adhesive failure - all of the adhesive remains on the test strip, i.e., the test panel is clean.
    Transfer failure - all of the adhesive is transferred to the panel, i.e., the test strip is clean.
    Residue failure - most of the adhesive remains with either the test panel or test strip. The other surface has a visible adhesive residue that is low in tack and can normally be smeared with finger rubs.

Figure 1:
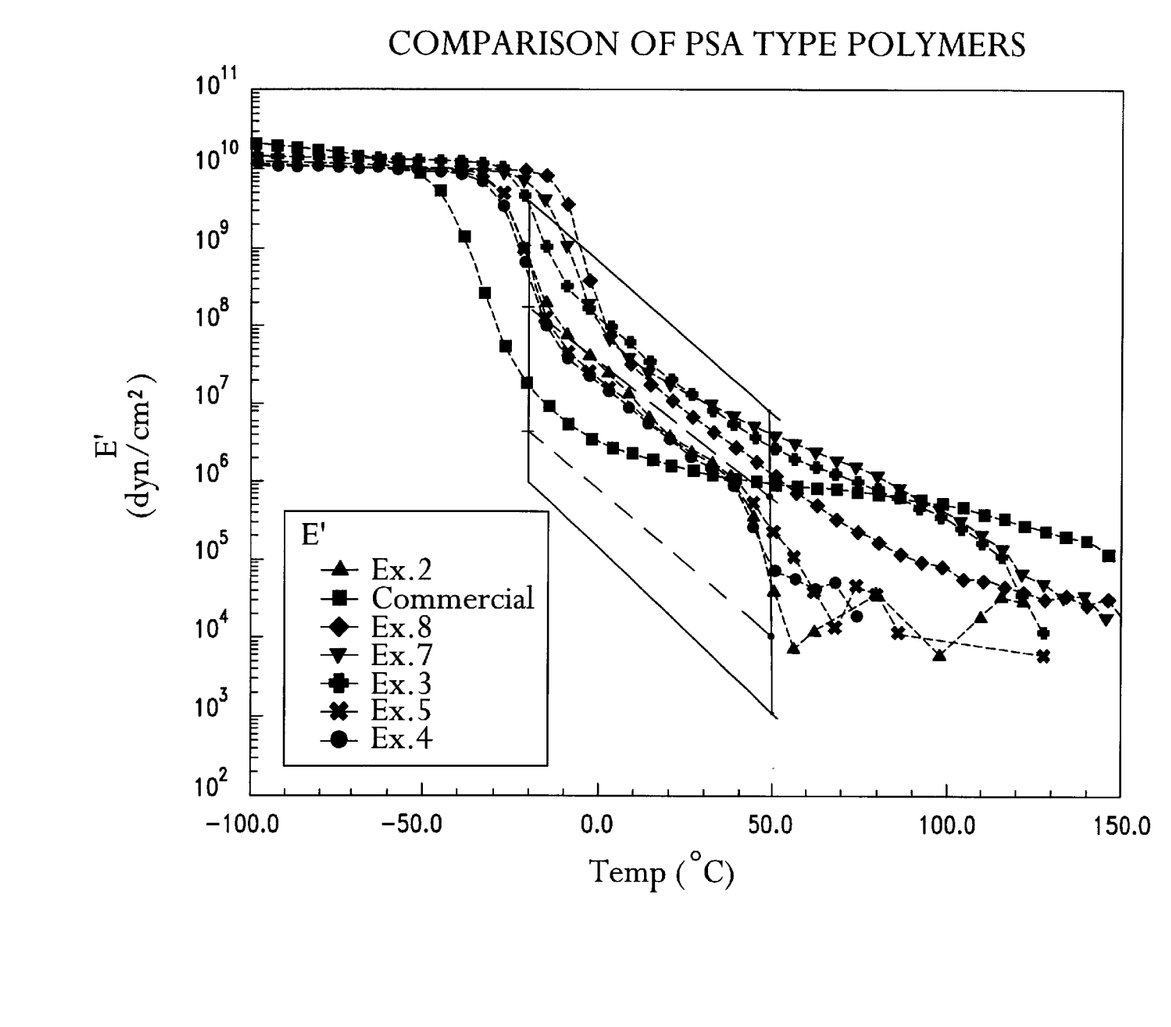
The drawing is a plot of storage modulus verses temperature for a series of vinyl acetate/ethylene copolymers and a commercial acrylic pressure sensitive adhesive.

The results show that even though the polymer compositions of Examples 3–7 were similar (similar glass transition temperatures) there is a difference in their performance as pressure sensitive adhesives. For example, the shear value of the redox catalyzed, low temperature polymerization of Example 3 resulted in extremely low shear value, i.e., less than 1 hour. Presumably, this was caused by low molecular weight due to high initiator concentration. In contrast, Examples 4–6 show polymers having good shear resistance (5 to 100 hours) as well as good loop tack (30 minute dwell >1.5 ) and peel adhesion to stainless steel (>1.5 and preferably >2). Example 7 indicates an extreme in shear performance. In Example 7, the temperature of polymerization was relatively low (65° C.) even though a thermally activated initiator was used. Example 8 shows the difference associated with lower ethylene content (35% by weight) and the use of polyvinyl alcohol as a stabilizing agent. The incorporation of polyvinyl alcohol protective colloid in the emulsion apparently accounted for the reduction in loop tack and increase in shear. This is noted in the Figure where the low temperature valued is above the desired range.

It is believed the low temperature polymerization associated with the thermal initiator resulted in a lower radical flux leading to molecular weight build. The molecular weight build is evidence by the higher low temperature storage modules values compared to Examples 4 and 5 (to be discussed in Example 11). Thus, it is believed the high linear molecular weight is responsible for the extreme shear resistance and that it also responsible for limiting the flow and wetting necessary to achieve good loop tack and peel resistance values.

Example 3 was prepared at a temperature lower than Example 7 but a redox initiator was used instead and the results show that the pressure sensitive adhesive performance is not related exclusively to either the glass transition temperature or the polymerization temperature. The use of a redox initiator at a lower temperature but employing a redox initiator provided the necessary radial flux to meet the viscoelastic properties as shown in Example 8. Thus, it can be seen the performance rather is related to the combination of conditions which allow preparation of a material having mechanical properties defined by the DMA storage modulus criteria.

Examples 4 and 5 show the influence of temperature. All totaled, the results show excellent adhesion to stainless steel, i.e. a peel and loop tack value or at least 2 as measured by the test and a shear value of at least 5 and preferably at least 8 hours and not greater than about 100 hours.

Some of the polymers set forth in Examples 1–8 also were analyzed by differential scanning calorimetry. This technique suggested the presence of low levels of crystalline regions within the materials described by these examples. In contrast to the prior art, it was surprisingly found that the presence of such crystallinity did not preclude the utility of these materials as pressure sensitive adhesives. Although the presence of crystallinity at such low levels is difficult to accurately characterize, the presence among the samples tested is consistent. Based upon the performance of the polymers prepared, the presence of this level of crystalline material did not limit the utility of these high ethylene content polymers as pressure sensitive adhesives.

To summarize, many combinations of temperature, initiator concentration, chain transfer agent concentration, monomer concentration and other conditions can be found which could lead to the desirable adhesive properties found in these materials. Therefore, the dynamic mechanical properties in terms of the storage modulus limits, in combination with the polymer composition, provide the most accurate and predictive capability of a vinyl acetate/ethylene copolymer as a pressure sensitive adhesive.

EXAMPLE 11

Pressure Sensitive Adhesive Peel, Tack and Shear Evaluation

The emulsions of Example 2, as well as two commercial acrylic pressure sensitive adhesives, were coated on a pilot coater at about 50 ft/min with a three-zone forced air drying oven at temperatures ranging from 60–110° C. using Polyslik siliconized release liner at a coat weight of about 25 g/m². The coated materials were then transferred onto 60# Britecoat paper, 2 mil Mylar and FlexCon vinyl film. The emulsion was able to coat on the siliconized Polyslik release liner without the need for any further formulating such as wetting agents or thickeners. The pressure sensitive properties were measured by PSTC methods for peel, loop tack and shear as previously described.

The results are tabulated in Table 2. The typical pressure sensitive properties for a commercial acrylic emulsion sold under the trademark Flexcryl 1625 bonded to Mylar film are provided for comparison purposes.

TABLE 2

| Sample | Flexcryl 1625 2 mil Mylar | Example 2 2-mil Mylar | Example 2 60# Britecoat | Example 2 Vinyl Film |
|---|---|---|---|---|
| 180° Peel g/25 mm[1] | 1360 | 2087 | Paper tear | 2087 |
| Loop Tack g/25 mm[2] | 1134 | 1179 | 1905 | 1560 |
| Shear (hour)[3] | 12 | 38 | 22 | 23 |

[1] and [2] Units changed from Table 1.

The results are tabulated in Table 3. The typical pressures sensitive properties for commercial acrylic emulsion sold under the trademark Flexcryl 1625 bonded to Mylar film are provided for comparison purposes.

EXAMPLE 12

Dynamic Mechanical Testing

The copolymers of Examples 1 and 2, as well as commercial copolymers were measured for tensile storage modulus in accordance with the following procedure.

Dynamic mechanical testing of the polymer samples was accomplished using the following procedure. ASTM-D-4065-94 and ASTM-D-5026-94 were used as guidelines for this procedure. Each polymer emulsion was cast as a film and allowed to dry a minimum of several days at ambient conditions. The dry film thickness was typically in the range of 1 to 1.5 mm. The specimens used for testing were die cut from the film and were about 6.3 mm wide and 30 mm long. The specimens were tested on a Rheometrics Solid Analyzer (RSA II), from Rheometric Scientific, Inc., to obtain the tensile dynamic mechanical properties. Data were obtained every 6° C. over a –100 to 200° C. range using a fiber/film fixture and a deformation frequency of 6.28 rad/sec. To help ensure linear viscoelastic conditions, the applied strains were typically 0.05% in the glassy region and up to 1% in the rubbery region. A soak time of one minute was used at each temperature to ensure isothermal conditions. For each temperature, the RSA II calculated the tensile storage modulus (E'), tensile loss modulus (E"), and tangent delta (tan d) based on the width, thickness and length of the sample.

The results are shown in the figure.

An interesting concept gained from a viewing of the figure is that the vinyl acetate/ethylene polymers produced herein have a storage modulus temperature relationship that follows the storage modulus temperature relationship for a commercial acrylic pressure sensitive adhesive. It is believed that is why the preferred vinyl acetate/ethylene polymers, such as those from Example 3 et seq., are effective as pressure sensitive adhesives.

What is claimed is:

1. In an aqueous vinyl acetate/ethylene pressure sensitive polymer adhesive comprised of polymerized units of vinyl acetate, ethylene, a carboxyl containing monomer and from 0–20 wt % of one or more additional ethylenically unsaturated copolymerizable monomers, said aqueous vinyl acetate/ethylene pressure sensitive polymer adhesive formed by emulsion polymerization in the presence of a stabilizing system, the improvement for enhanced pressure sensitivity of the vinyl acetate/ethylene polymer which comprises:

a polymer having an ethylene content from 45 to 65% by weight and a Tg of from –25 to –70° C.; and, a tensile storage modulus measured at one hertz encompassed within the points on a plot of tensile storage modulus and temperature of from 1 times $10^6$ and 4 times $10^9$ dynes/cm$^2$ at a temperature of –20° C. and 1 times $10^7$ dynes/cm$^2$ and $1 \times 10^3$ dynes/cm$^2$ at a temperature of 50° C.

2. The adhesive of claim 1 wherein the tensile storage modulus measured at one hertz is embraced by the points from $5 \times 10^6$ and $2 \times 10^8$ dynes/cm$^2$ at –20° C., and $1 \times 10^4$ and $1 \times 10^6$ dynes/cm$^2$ at 50° C.

3. The adhesive of claim 2 wherein the carboxyl containing monomer is incorporated into the polymer in an amount of from 0.2 to 10% by weight.

4. The adhesive of claim 3 wherein the stabilizing system for the aqueous vinyl acetate/ethylene pressure polymer adhesive is comprised of an ethoxylated secondary alcohol or a sulfosuccinate.

5. The adhesive of claim 3 wherein the ethylene content of the polymer is from 45 to 55% by weight.

6. The adhesive of claim 5 wherein the particle size diameter of the polymer has a number average of from 0.1 to 0.4 $\mu$ and a weight average from 0.15 to 0.8$\mu$.

7. The adhesive of claim 6 wherein the stabilizing system is comprised of a surfactant selected for the group consisting of an ethoxylated secondary alcohol and a sulfosuccinate.

8. The adhesive of claim 2 wherein the aqueous vinyl acetate/ethylene pressure sensitive adhesive consists essentially of the polymerized monomers designated (a) through (c) in the following weight percentages:

(a) 40–50 wt % vinyl acetate;

(b) 45–55 wt % of ethylene; and, (c) 0.5–2 wt % alpha, beta-ethylenically unsaturated monocarboxylic acid.

9. The adhesive of claim 8 wherein the polymer has a $T_g$ of from –25 to –35° C.

10. The adhesive of claim 9 wherein the carboxyl containing monomer is acrylic acid.

11. The adhesive of claim 1 wherein the tensile storage modulus measured at one hertz is embraced by the points from $5 \times 10^6$ and 4 times $10^9$ dynes/cm$^2$ at $-20°$ C., and $1 \times 10^3$ and $1 \times 10^7$ dynes/cm$^2$ at $50°$ C.

12. The adhesive of claim 11 wherein the aqueous vinyl acetate/ethylene pressure sensitive adhesive consists essentially of the polymerized monomers designated (a) through (c) in the following weight percentages:

(a) 40–50 wt % vinyl acetate;
(b) 45–55 wt % of ethylene; and,
(c) 0.5–2 wt % alpha, beta-ethylenically unsaturated monocarboxylic acid.

13. The adhesive of claim 12 wherein the polymer has a $T_g$ of from $-25$ to $-35°$ C.

14. The adhesive of claim 13 wherein the carboxyl containing monomer is acrylic acid.

* * * * *